United States Patent [19]

Hirayama et al.

[11] 4,330,347
[45] May 18, 1982

[54] RESISTIVE COATING FOR CURRENT CONDUCTORS IN CRYOGENIC APPLICATIONS

[75] Inventors: Chikara Hirayama; George R. Wagner, both of Murrysville, Pa.

[73] Assignee: The United States of America as represented by the United States Department of Energy, Washington, D.C.

[21] Appl. No.: 115,866

[22] Filed: Jan. 28, 1980

[51] Int. Cl.³ .............................................. B32B 33/00
[52] U.S. Cl. ..................................... 148/31.5; 72/46; 72/700; 148/6.31; 174/126 S; 174/128 S; 428/389; 428/614; 428/628; 428/639; 428/661; 428/662; 428/674; 428/930
[58] Field of Search ............... 428/628, 629, 639, 611, 428/660-664, 671, 674-677, 930, 379, 389, 614, 606-608; 427/62, 63; 174/126 S, 128 S, 110 R; 72/46, 700; 148/31.5, 6.31

[56] References Cited

U.S. PATENT DOCUMENTS

| | | | |
|---|---|---|---|
| 744,077 | 11/1903 | Ingalls | 148/31.5 |
| 1,751,360 | 3/1930 | Ruben | 148/6.31 |
| 1,895,685 | 1/1933 | Ruben | 148/31.5 |
| 3,203,836 | 8/1965 | Gaynon et al. | 148/31.5 |
| 3,428,925 | 2/1969 | Bogner et al. | 135/216 |
| 3,910,802 | 10/1975 | Wong | 148/32 |
| 3,954,572 | 5/1976 | Ziegler et al. | 204/37 T |
| 3,958,327 | 5/1976 | Marancik et al. | 29/599 |
| 4,003,762 | 1/1977 | Ceresara et al. | 148/11.5 R |

OTHER PUBLICATIONS

Chi, K.C., et al., "Renctively Evaporated Films of Copper Molybdenum Sulfide", *Thin Film Solids*, vol 54, pp. 259-261 (1978).

Chi, K.C. et al., "Evaporated Films of Superconducting CuMo Sulphide, *Thin Film Solids*, vol. 47, pp. L9-L13 (1977).

*Primary Examiner*—Michael L. Lewis
*Attorney, Agent, or Firm*—Stephen D. Hamel; Richard G. Besha; James E. Denny

[57] ABSTRACT

This invention relates to a resistive or semiconducting coating for use on current conductors in cryogenic applications. This includes copper-clad superconductor wire, copper wire used for stabilizing superconductor magnets, and for hyperconductors. The coating is a film of cuprous sulfide ($Cu_2S$) that has been found not to degrade the properties of the conductors. It is very adherent to the respective conductors and satisfies the mechanical, thermal and electrical requirements of coatings for the conductors.

3 Claims, 1 Drawing Figure

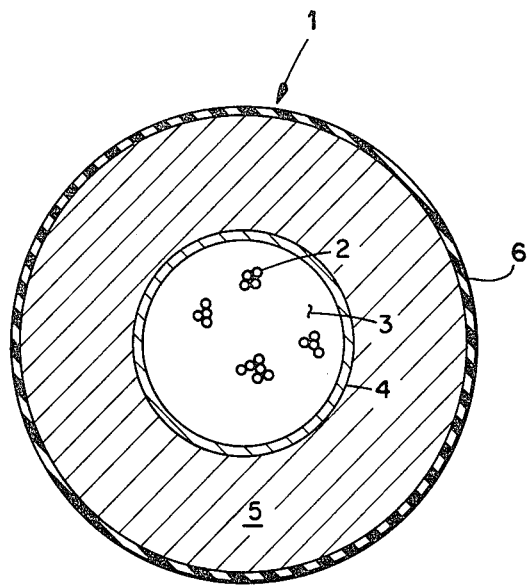

RESISTIVE COATING FOR CURRENT CONDUCTORS IN CRYOGENIC APPLICATIONS

BACKGROUND OF THE INVENTION

The invention relates to the reduction of coupling currents between current carrying conductors in cryogenic systems, and more particularly to a coating for the surface of these conductors in such applications as superconducting magnets. It is the result of a contract with the U.S. Department of Energy.

A typical cable of a superconducting magnet coil is compacted into a stainless steel jacket. Each strand of the cable is a multi-filamentary superconductor having a central core which consists of a large number (about 2000) of filaments of few $\mu m$ in diameter imbedded in a bronze (Cu-Sn) matrix. The superconducting material of these filaments may be $Nb_3Sn$, NbTi, etc. The core is often surrounded by a thin tantalum sheath and outside the tantalum is a layer of high-conductivity copper.

Because $Nb_3Sn$ superconducting filaments are quite brittle, the cabling and compacting operations must be performed before the $Nb_3Sn$ is formed. This is accomplished by manufacturing the wire with niobium filaments, performing all the mechanical operations, and then heat treating the sheathed conductor in its final configuration to form the $Nb_3Sn$ by the so-called bronze diffusion process. In this process, the conductor is annealed at approximately 700° C. for about 20 hours causing the tin to diffuse from the bronze and allow with the niobium to form $Nb_3Sn$. The tantalum barrier prevents the Sn from diffusing into the copper and lowering its electrical conductivity.

Each strand in the cable must have an electrical resistive layer on its surface to reduce coupling currents between strands. Choosing a satisfactory layer has become a critical problem because it must meet certain requirements, some of which conventional organic insulating systems cannot satisfy. Among these are:

1. It must be applied at temperatures below about 530° C.
2. It must withstand a reaction temperature of 700° C. for about 20 hours.
3. It must not diffuse into the copper or attack it in any way such as to lower the copper electrical conductivity during the reaction anneal.
4. It must not chip, scrape, or flake off during cabling and compaction.
5. It need not be insulating at room temperature, but it must be resistive at cryogenic temperatures.
6. It should not evolve any liquids or condensable solids during the reaction anneal at 700° C.

It is an object of the present invention to provide a suitable electrical resistive layer on each strand of a superconducting cable to prevent current flow between strands, said layer meeting the above requirements.

Other objects, advantages and novel features of the invention will become apparent to those skilled in the art upon examination of the following description of a preferred embodiment of the invention and the accompanying drawing.

SUMMARY OF THE INVENTION

To achieve the foregoing and other objects and in accordance with the purpose of the present invention, a superconducting article is provided which may comprise a copper-containing substrate which has an electrically insulating, adherent coating formed thereon of copper sulfide. The copper sulfide coating is formed by contacting the copper-containing substrate with a gas-containing sulfur to form the adherent copper sulfide coating ($Cu_{2-x}S$), where x is $<0.5$. The cuprous sulfide coating becomes an electrical insulator at cryogenic temperatures.

BRIEF DESCRIPTION OF THE DRAWING

The single FIGURE is a schematic cross-sectional view of a typical superconductor strand for use in a standard cable for superconducting magnets.

DESCRIPTION OF THE PREFERRED EMBODIMENT

A typical superconductor wire strand used in a sheathed cable is illustrated in the single FIGURE and comprises a large number of superconductor, e.g., $Nb_3Sn$, filaments 2 imbedded in a copper-rich matrix 3, e.g., bronze. The matrix 3 (core) is surrounded by a thin tantalum sheath 4 and outside the sheath 4 is a layer 5 of high-conductivity copper. Before the strand 1 of the FIGURE and others like it are compacted into a stainless steel jacket to form the stranded cable, each of the individual strands must have an electrically resistive layer on its surface to reduce the coupling of currents between strands in the finally assembled cable.

It has been discovered that a semiconducting film of cuprous sulfide ($Cu_2S$) 6 applied to the outer copper surface of each strand is an ideal outer layer for the strand. Since the cuprous sulfide may not be stoichiometric, a more proper designation would be $Cu_{2-x}S$, where $X < 0.5$; however, for convenience hereinafter; $Cu_2S$ will be used in this specification. Such a film becomes resistive at cryogenic temperatures, has excellent adhesion to copper, and does not chip or spall when the strand is bent over a radius subjecting it to a strain of the order of 2% or less. Also, the $Cu_2S$ is stable in an inert atmosphere at 700° C. and does not degrade the electrical properties of the copper to which it is attached when subjected to 700° C. for at least 30 hours.

The $Cu_2S$ film is formed on the surface of copper by reacting with $H_2S$ gas in the absence of oxygen. Based on chemical thermodynamic principles, the $Cu_2S$ is formed in preference to $CuS$ when the $H_2S$ reacts with the copper, especially at temperatures above 500° C. At temperatures of 150° to 200° C., a film thickness of approximately 1.5 $\mu m$ is formed in 30 minutes. At 500° C., approximately the same thickness is formed in less time. The particular temperature is chosen to achieve a desired coating thickness in reasonable times, without degrading the quality of the superconductor. For example, if the superconductor strand contains NbTi, a $Cu_2S$ layer would have to be formed at temperatures below 300° C. to avoid a reduction in the critical current due to annealing of the cold work in the NbTi.

An alternative method for the formation of the $Cu_2S$ film is to expose the Cu to an atmosphere of sulfur vapor at a suitable temperature.

EXAMPLE 1

Approximately three meters (10 ft.) of 0.71 mm (0.028 in.) diameter oxygen-free, high-conductivity (OFHC) copper wire was rolled into a coil of approximately 10 cm (4 in.) diameter. This coil was then placed into a silica tube of about 5 cm (2 in.) diameter, and the tube was placed in a split tube furnace. The silica tube was connected at one end to a source of argon and of $H_2S$, and the other end was vented to an oil bubbler. The loaded silica tube was first flushed with argon before the sample was heated, then the furnace temperature was raised to 200° C. and H$_2$S was slowly passed through the tube. After 15 minutes the H$_2$S flow was terminated and the system was flushed with argon. The furnace temperature was then rapidly raised to 700° C. while argon was continuously passed through the tube. The furnace was turned off after approximately 30 minutes at 700° C., and the sample was removed after cooling. The wire was completely coated with the black Cu$_2$S. A two-strand twist sample of this wire showed an electrical breakdown strength of 25 volts at 77° K. The resistivity measurements of the coated wire at room temperature and at liquid helium temperature showed that the Cu$_2$S formation did not affect the conductivity of the copper. The adhesion of the Cu$_2$S to the copper surface was excellent.

EXAMPLE 2

Approximately 6 meters (20 ft.) of the same OFHC wire was coiled and loaded into a silica tube as described in Example 1. The wire was reacted with H$_2$S at 175° to 200° C. for 30 minutes, then the H$_2$S flow was switched to that of argon as in Example 1. The black Cu$_2$S film which formed was very adherent and did not chip or spall when the wire was bent over a sharp angle. The thickness of the Cu$_2$S film was approximately 1.5 micrometers.

EXAMPLE 3

A 915 meter (3000 ft.) length of copper-clad Nb$_3$Sn superconductor wire was passed through a 0.9 m (3 ft.) long tube furnace having a wall temperature of about 750° C. The wire was moved through the furnace at 3.35 m (11 ft.)/min. A mixture of argon and H$_2$S was continuously fed to the furnace, with the H$_2$S flow rate being about 400 cc/min. (The flow rate of argon is not important to the rate of coating formation. The surface of the wire reached about 540° C., and any portion of the wire was within the furnace for about 16.5 sec. The resultant Cu$_2$S coating on the wire was about 5 μm.

It can be seen from the foregoing Examples 1 and 2 that an adherent Cu$_2$S film may be applied to copper wire such as those used as stabilizers which are cabled with superconductor wire to form cables and braids. The layer provides enough insulation to reduce eddy current losses between strands, but enough conductivity to allow current transfer from the superconductor to the copper wires in the event that the superconductor normalizes.

The results obtained in Example 3 are not dependent upon the matrix of the superconductor wire. In practice, this matrix may be any copper-rich alloy such as Cu-Ni or Cu-Sn. As stated above, there is a temperature limit to prevent damage to the superconductor material. The cited specific conditions provided a very tough Cu$_2$S coating thickness. By varying the H$_2$S flow, the wire speed through the furnace, and the furnace temperature, a suitable thickness of about 1.5 μm to about 20 μm may be obtained. A thickness of less than about 1.5 μm may not provide a sufficiently resistive layer, and thicknesses above about 20 μm tend to spall from the surface upon severe bending of the wire. Temperatures for coating may be as low as room temperature; however, long coating times are required unless the temperature is above about 200° C.

In addition there are uses of Cu$_2$S coatings for applications other than for superconducting cables, and components thereof. For instance, it could be applied to the recently developed "hyperconductors" which are normal conductors with very high electrical conductivity at low temperatures.

The foregoing description of a preferred embodiment of the invention, i.e., as applied to superconductor wires, has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments as are suited to the particular use contemplated. It is intended that the scope of the invention be defined by the claims appended hereto.

What is claimed is:
1. A superconducting article comprising:
   a matrix core containing a superconductor;
   a copper-containing cladding disposed about said core; and
   an adherent coating of copper sulfide formed on the outer surface of said cladding which is electrically insulating at cryogenic temperatures.
2. The article of claim 1 wherein said coating is Cu$_{2-x}$S, where x is less than 0.5.
3. The article of claim 2 wherein said layer has a uniform thickness in the range of from 1.5 to 20 μm.

* * * * *